June 21, 1932. P. J. HANSON 1,863,691
COMBINE HARVESTER
Filed April 19, 1930 5 Sheets-Sheet 1
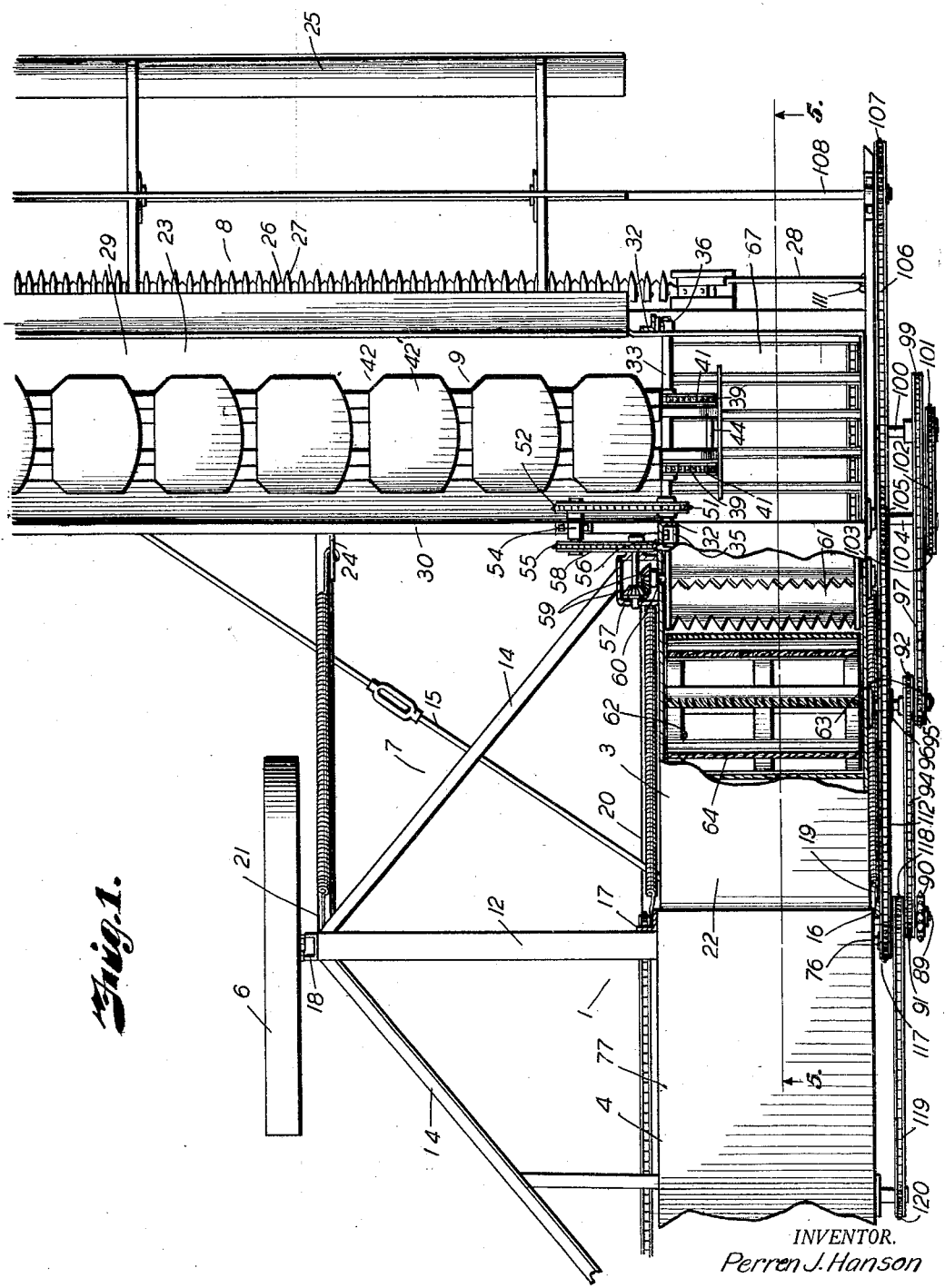
INVENTOR.
Perren J. Hanson
BY
ATTORNEY.

June 21, 1932.    P. J. HANSON    1,863,691
COMBINE HARVESTER
Filed April 19, 1930    5 Sheets-Sheet 2
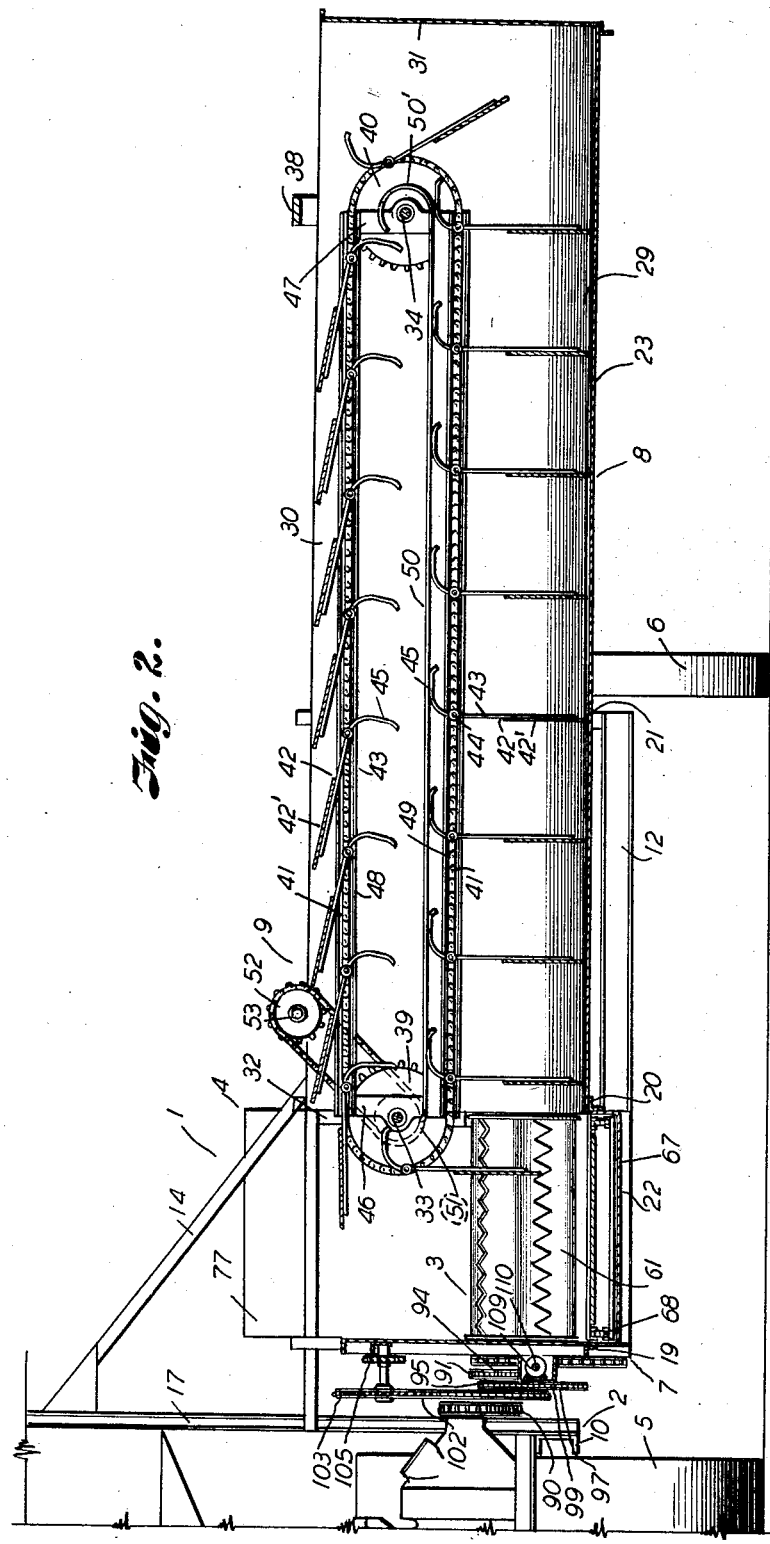
INVENTOR.
Perren J. Hanson
ATTORNEY

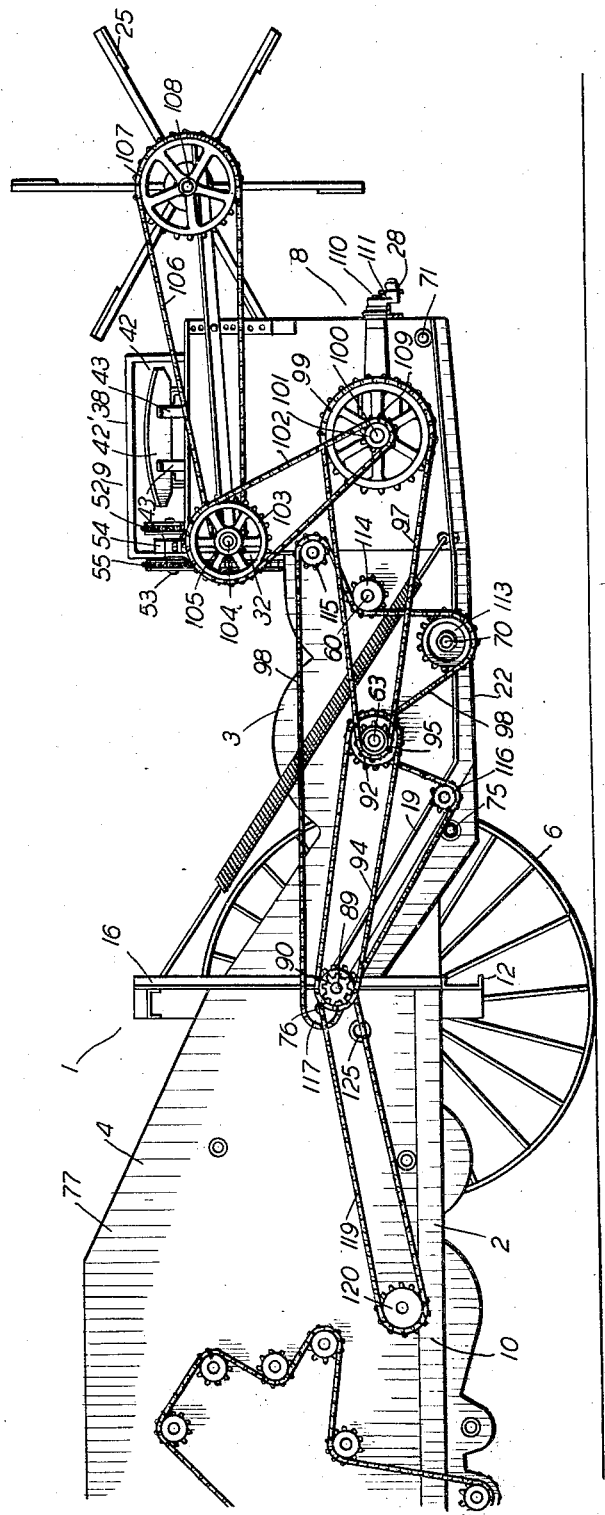

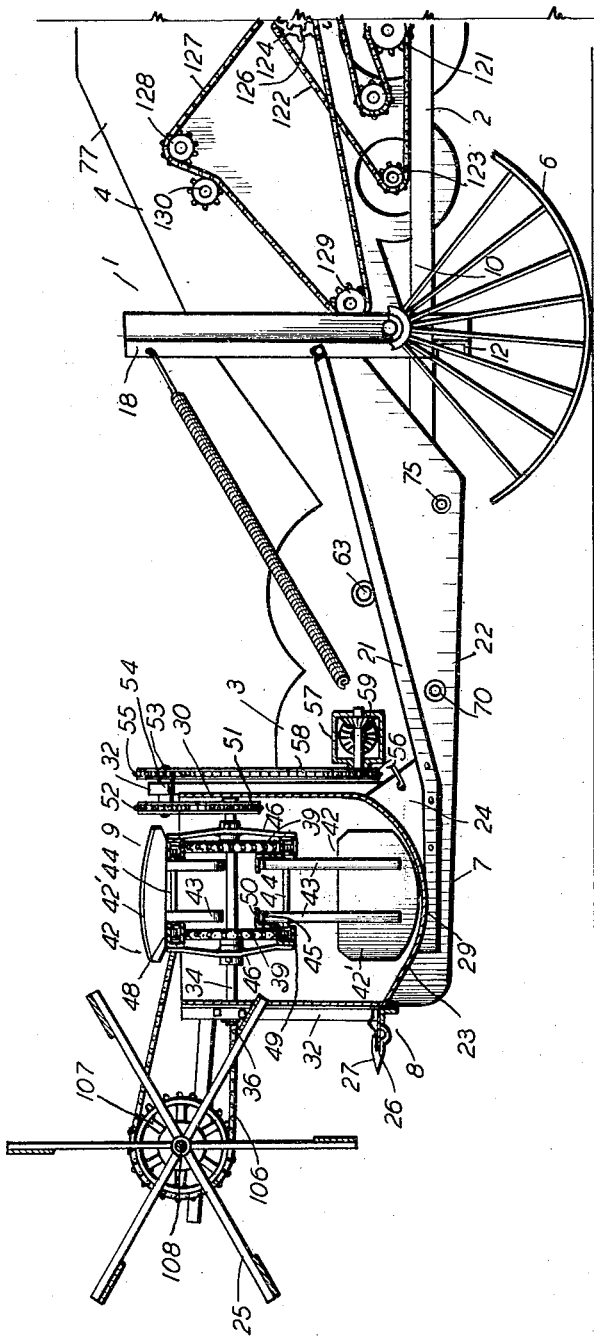

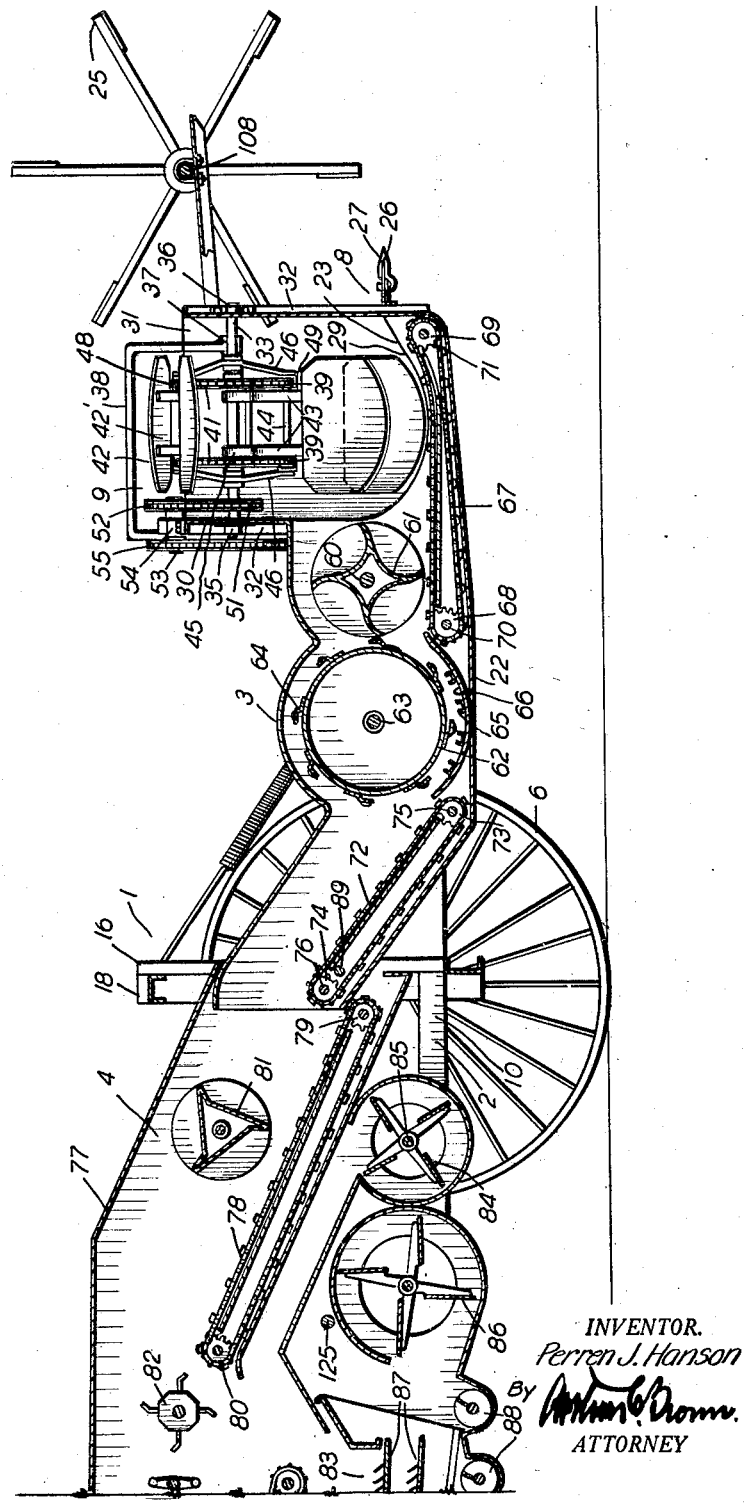

Patented June 21, 1932

1,863,691

UNITED STATES PATENT OFFICE

PERREN J. HANSON, OF INDEPENDENCE, MISSOURI, ASSIGNOR TO GLEANER COMBINE HARVESTER CORPORATION, OF INDEPENDENCE, MISSOURI, A CORPORATION OF DELAWARE

COMBINE HARVESTER

Application filed April 19, 1930. Serial No. 445,721.

My invention relates to combine harvesters of the type including grain cutting, threshing and separating mechanisms in coordinated units, and more particularly to a conveyor for delivering cut grain to the threshing mechanism, the principal object of the invention being to effect steady and uniform flow of grain from the cutting mechanism to the thresher mechanism, regardless of variation in density of the standing grain.

In accomplishing this and other objects of the invention, I have provided improved details of structure, the preferred form of which is illustrated in the accompanying drawings, wherein:

Fig. 1 is a plan view of a combine harvester partly broken away and particularly illustrating my improved conveyor mechanism.

Fig. 2 is a central, longitudinal section through the conveyor mechanism illustrating its relation with the thresher unit.

Fig. 3 is a side elevation of the machine particularly illustrating the driving mechanism connecting the operative elements of the various units.

Fig. 4 is a side elevation of the machine showing the cutting unit in section for better illustration.

Fig. 5 is a longitudinal, sectional view through the thresher and separator housing on the line 5—5, Fig. 1.

Referring in detail to the drawings:

1 designates the harvester machine including a main frame 2, portably supporting thresher and separator units 3 and 4 on wheels 5 and 6, and 7 a sub-frame extending at right angles to the main frame at the front of the machine and supporting a cutting unit 8, from which cut grain is delivered to the thresher unit by my improved conveyor mechanism 9, later described.

The main frame 2 includes longitudinal members 10, and a lateral member 12 extending in parallel, spaced relation with the axis of the cutting unit 8, and braced therefrom by diagonal braces 14 and an adjustable brace 15. Mounted on the members 10 and 12 are vertical standards 16, 17 and 18, respectively, pivotally supporting arms 19, 20, and 21 attached to the housing 22 of the thresher unit and to the receiver pan 23 of the cutting unit by a gusset 24, to permit vertical adjustment of the cutting unit to the height of the grain in which the machine is operating.

The cutting unit 8 includes a reel 25 cooperating with a sickle 26 on the front longitudinal edge of the receiver pan 23 and reciprocable in guards 27 by a pitman 28 for cutting the grain as the machine is drawn through a field by suitable power traction means (not shown).

The receiver pan 23 includes a concave bottom portion 29 fitted with a back board 30, an end plate 31, and end posts 32 for mounting the conveyor mechanism presently described.

Mounted adjacent the ends of the receiver pan 23 and in spaced relation with the bottom of the pan are shafts 33 and 34 journaled in bearings 35 and 36 on the posts 32 and in bearings 37 of a bracket 38 on the outer end of the back board, and fitted with spaced and paired sprockets 39 and 40 carrying endless chain belts 41 on which are mounted a set of spaced impeller members 42, each including paired arms 43 pivotally mounted on a tie rod 44 carried by and extending between the paired belts and provided at their outer ends with sweeper blades 42'. The inner ends of the arms 43 are curved to form slide shoes 45 for stabilizing impellers as hereafter described.

Supported on the shafts 33 and 34, in spaced relation with the back board 30 and with the front longitudinal edge of the receiver pan 23, are vertical brackets 46 and 47 carrying guide channels 48 and 49 for supporting the chain belts between the sprockets, the lower channels 49 having upwardly and inwardly extending rail portions 50 engageable by the slide shoes 45 of the impeller members 42 for bracing the members in substantially vertical position during their longitudinal movement through the receiver pan toward the thresher unit 3.

The rail portions 50 are curved upwardly about the shaft 34 to form trip and cam members 50' for engaging the slide shoes 45 to up end and guide the impellers 42 into functioning position for advancing cut grain through the receiver pan 23 with the shoes braced beneath the rails as shown in Fig. 2. The inner end of the rails 50 terminate with the guide channel 49 at a point substantially in vertical alignment with the shaft 33, to release the bracing shoes and permit the impellers to rise through the thresher chamber in a substantially vertical position.

Mounted on the shaft 33 is a sprocket 51 operably connected with a sprocket 52 on a stub shaft 53 journaled in a bearing 54 on the back board 30, and mounted on the opposite end of the shaft 53 is a sprocket 55 connected by a chain 58 with a sprocket 56 of a gear transmission 57 including bevel gears 59 for operating the feeder shaft 60 of the thresher unit presently described.

The thresher unit includes a feeder member 61 fixed on the shaft 60, a cylinder 62 fixed on the shaft 63 and having rasp bars 64 cooperating with channel bars 65 of a concave 66 to which grain is delivered from the conveyor 9 by a transversely disposed belt conveyor 67 operable over sprockets 68 and 69 on horizontally spaced shafts 70 and 71.

Mounted in the thresher housing 22 rearwardly of the cylinder 62 is an inclined endless carrier 72 operating over sprockets 73 and 74 on shafts 75 and 76 for delivering threshed grain from the cylinder into a separator housing 77. Located in the separator housing 77 is an endless inclined carrier 78 carried on sprockets 79 and 80, its lower end positioned below the outlet from the thresher housing for receiving the threshed grain, and located in vertical spaced relation with the carrier is a beater 81 and separating packer 82 for beating and agitating the grain as it passes through the separator housing to a cleaning shoe 83.

Located in the separating chamber below the carrier 78 is a primary cleaner fan 84 on a shaft 85 for directing a blast of air into the grain passing over the carrier 78, and a secondary cleaner fan 86 for directing air through sieves 87 of the cleaning shoe, whereby the grain is cleaned before descending by gravity into screw conveyors 88 at the bottom of the separator housing, from which the grain may be elevated to a suitable receptacle by elevator means (not shown).

In connecting the various elements of the cutting, threshing and separating units for operation at proper relative speeds from a suitable source of power such as a motor (not shown), a drive shaft 89 pivotally connecting the thresher and separator housings is provided with a sprocket 90 operably connected with the motor, and fitted with a sprocket 91 connected with a sprocket 92 on the cylinder shaft 63 by a chain 94, and fixed on the cylinder shaft are sprockets 95 and 96 cooperating with belt chains 97 and 98.

The chain belt 97 engages a sprocket 99 fixed on a shaft 100 on the receiver pan 23, and carrying a sprocket 101 fitted with a chain 102 for driving a sprocket 103 on a stub shaft 104 supported on the back board, and having a sprocket 105 from which the reel 25 is driven by a chain 106 engaging a sprocket 107 on the reel shaft 108. Operably connected with the shaft 100 is a gear transmission 109 having a forwardly extending shaft 110 fitted with a crank 111 connected with the pitman 28, whereby the sickle 26 is operated simultaneously with rotation of the reel.

The chain belt 98 extends over a sprocket 113 on the shaft 70 of the transverse conveyor 67, a sprocket 114 on the feeder shaft 60, over idler sprockets 115—116, and a sprocket 117 of the carrier shaft 76, whereby the feeder and carrier 72 are driven.

Fixed on the drive shaft 89 is a sprocket 118 carrying a chain 119 extending over a sprocket 120 for operating the secondary cleaner fan 86. Fixed on the shaft of the secondary fan on the opposite side of the separator housing is a sprocket 121 cooperating with a chain belt 122 extending over a sprocket 123 of the primary fan and over a sprocket 124 on a rocker shaft 125, whereby the rocker shaft and primary fan are operated simultaneously with the secondary fan and other elements operatively connected therewith.

Fixed on the rocker shaft 125 with the sprocket 124 is a sprocket 126 carrying a chain belt 127 extending over idler sprockets 128 and 129 and over a sprocket 130 on the beater shaft 81.

In using a combine harvester including my invention, the machine is moved through a field of standing grain under suitable traction power and the various units of the machine operated preferably by a separate motor through the various chain belt connections, the conveyor 9 embodying the features of my invention operating as follows:

Rotation imparted to the shaft 90 by the motor is transmitted to the cylinder shaft 63 by the chain belt 94 and to the feeder shaft 60 by the chain belt 98.

The gear transmission 57 on the opposite end of the feeder shaft causes rotation of the sprocket 56 which in turn causes rotation to be imparted to the stub shaft 53 on the back board 30, and the sprocket 52 on the stub shaft through its chain belt connection with the sprocket 51 on the shaft 33 causes clockwise rotation of the sprockets 39 for carrying the chain belts 41 over the sprockets 40, whereby the impeller members 42 are moved longitudinally along the bottom of the receiver pan 23 for delivering the grain through the concave bottom portion of the receiver pan onto the belt conveyor 67, whereby the grain is delivered to the feeder 61 and thresher cylinder 60.

As the shoes 45 of the impellers 42 become disengaged from the inner end of the slide rail 50, the impellers are free to swing on the rods 44 and due to their weight are retained in a substantially vertical position for preventing displacement of grain from the thresher chamber during their upward movement over the sprockets 39.

The impellers 42 fold back on the guide rail 48 during their outward or idle movement, and the slide shoes 45 project downwardly for engagement with the stop 50' whereby the impellers are swung into functioning position at the outer end of the receiver pan 23 for delivering grain in a substantially constant and uniform flow to the thresher cylinder.

The grain passes steadily and evenly through the thresher cylinder permitting thorough threshing of the grain which is then delivered over the carriers 72 and 78 into the separator in a constant uniform flow, thereby permitting thorough cleaning of the grain by blasts of air from the primary fan 84 and secondary fan 86.

Since it is necessary in grain threshing operations to maintain a steady and uniform flow of grain to the threshing mechanism, it will be obvious that a thresher equipped with my improved conveyor will operate with a high degree of efficiency regardless of heavy or light stands of grain and will consequently effect a considerable saving of grain at a minimum operating expense.

What I claim and desire to secure by Letters Patent is:

1. In a machine of the character described, a receiver for cut grain, means for discharging grain straw crosswise of the receiver, and a conveyor including sweeper members movable longitudinally of the receiver across the path of discharge of the grain straw, for delivering cut grain from the receiver.

2. In a machine of the character described, a receiver for cut grain, means for discharging grain crosswise of the receiver, and sweeper plates movable longitudinally of the receiver for delivering cut grain from the receiver.

3. In a machine of the character described, a pan for receiving cut grain, an endless belt extending longitudinally over the pan, sweeper blades on the belt, means for discharging grain crosswise of the receiver between the sweeper blades, and means for actuating the belt.

4. In a machine of the character described, a pan for receiving cut grain, a conveyor including an endless belt extending longitudinally over said pan, sweeper blades pivotally supported on said belt, means for delivering the cut grain at points longitudinally of the pan between said sweeper blades, and means for operating the belt.

5. In a machine of the character described, a pan for receiving cut grain, means for discharging the grain laterally in the pan so that the grain heads are arranged across the conveyor, a conveyor including an endless belt, sweeper blades pivotally supported on said belts, means for retaining the sweeper blades in sweeping relation with said pan to advance the grain heads in orderly arrangement in the pan, and means for actuating the belt.

6. In a machine of the character described, a pan for receiving cut grain, means for discharging grain into the pan from a side thereof, a conveyor including an endless belt, sweeper blades pivotally supported on said belt and having extension arms, a slide rail cooperating with the extension arms for retaining the sweeper blades in a substantially vertical position in the grain pan so that portions of the grain discharged into the pan may pass between the sweeper blades and be separated thereby as it is swept along the pan, and means for actuating the belt.

7. In a machine of the character described, a pan for receiving cut grain, means for discharging grain into the pan from a side thereof, a conveyor including an endless belt, sweeper blades supported in spaced relation on the belt for cooperation with the pan and having slide shoe portions, and a slide rail cooperating with said slide shoe portions for retaining the sweeper blades in substantially vertical position in the receiver pan so that grain discharged into the side of the pan may pass between the sweeper blades.

8. In a machine of the character described, a pan having an open side extending throughout the length of the pan for receiving cut grain, means for discharging grain crosswise of the pan and through the open side thereof, a conveyor including an endless belt, hanger members pivotally supported on said belt and having slide shoes, sweeper blades on the hanger members supported in sweeping relation with said pan for engaging the grain, and a rail engageable by said slide shoes arranged to retain the sweeper blades substantially at right angles to the grain receiving pan to propel the grain with the heads positioned in crosswise arrangement along the pan.

9. In a machine of the character described, a pan for receiving cut grain, means associated with the pan for discharging cut grain into the pan with the heads extending crosswise of the pan, a conveyor including shafts rotatably supported by the ends of the pan, sprockets on said shafts, endless belts on said sprockets, guide channels supporting said belts, hanger members pivotally supported on the belt and having slide shoes, sweeper blades on the hanger members supported in sweeping relation with said pan, and slide rails engageable by the slide shoes for retaining the sweeper blades in sweeping relation with the receiving pan.

In testimony whereof I affix my signature.

PERREN J. HANSON.